United States Patent [19]
Wheeler et al.

[11] Patent Number: 5,409,037
[45] Date of Patent: Apr. 25, 1995

[54] AUTOMATIC DEVICE FOR THE DETECTION AND SHUTOFF OF EXCESS WATER FLOW IN PIPES

[76] Inventors: Jaye F. Wheeler, 1413 Crockett La., Silver Spring, Md. 20904; Glenn Sicard, 6469 Bellview Dr., Columbia, Md. 21046

[21] Appl. No.: 254,055
[22] Filed: Jun. 6, 1994
[51] Int. Cl.6 .............................................. F16K 37/00
[52] U.S. Cl. ................. 137/551; 137/624.12; 137/487.5; 251/129.11; 251/292
[58] Field of Search ............... 137/624.11, 624.12, 137/78.1, 312, 551, 486, 495, 487.5; 251/129.11, 292

[56] References Cited
U.S. PATENT DOCUMENTS

| | | | |
|---|---|---|---|
| 4,195,374 | 4/1980 | Morris et al. | 137/624.12 |
| 4,417,312 | 11/1983 | Cronin et al. | 137/487.5 |
| 4,911,200 | 3/1990 | Ben-Arie | 137/624.12 |
| 5,004,014 | 4/1991 | Bender | 137/486 |
| 5,038,820 | 8/1991 | Ames et al. | 137/624.12 |
| 5,086,806 | 2/1992 | Engler et al. | 137/624.12 |
| 5,287,884 | 2/1994 | Cohen | 137/624.12 |

*Primary Examiner*—A. Michael Chambers

[57] ABSTRACT

A readily detachable automatic programmable water shutoff device for stopping the flow of excess water in plumbing pipes of a plumbing pipe system. This device requires no plumbing pipe system modifications for installation and use. The device comprises a detachable acoustic flow sensor which is placed externally on existing plumbing pipe, a detachable valve actuator which consist of a high torque motor attached to existing plumbing pipe valve stem, and a microprocessor based control circuit which a) monitors state of flow sensor, b) provides an operator control interface to the device, c) determines excess water flow conditions, d) provides an output signal to the high torque motor which shuts off the water for an excess water flow condition.

9 Claims, 7 Drawing Sheets

AUTOMATIC DEVICE FOR THE DETECTION AND SHUTOFF OF EXCESS WATER FLOW IN PIPES

BACKGROUND—FIELD OF INVENTION

The present invention relates generally to the field of plumbing and more specifically to a system for shutting off a supply of water or other fluid upon the detection of an excess fluid flow condition.

BACKGROUND—PRIOR ART

Prior art which use in-line flow detectors or special in-line shutoff valves require expensive modification to the plumbing system for installation. The same costly procedure will be required to remove the apparatus should it be needed elsewhere.

The prior art which detects fluid external to the plumbing system requires many sensors placed at multiple locations and or an excessive amount of fluid loss to detect excess flow under normal conditions.

The temperature sensitive water supply shutoff system in U.S. Pat. No. 5,090,436 to Hoch and Moore 1992, Feb. 25, which makes use of outside air temperature as the criteria to shut off the water supply, does not shutoff the supply in the event of excess flow not related to temperature. For example a tub which has overflowed, a broken washing machine hose or faulty plastic water pipes would not cause the device to activate.

The temperature sensitive water supply shutoff system in U.S. Pat. No. 5,090,436 to Hoch and Moore 1992, Feb. 25, which use special electrically operated in-line valves to shutoff the supply of water in the event of excess water flow, has no manual operation in case of power failure. In some cases the apparatus would actually shutoff the supply of water leaving the water user with no way of turning the water supply back on.

The automatic device for detection and shutoff of unwanted liquid flow in pipes, U.S. Pat. No. 4,736,763 to Britton, Ratino and Peterman 1988, Apr. 12, generally expects a fixed amount of excess water flow for all situations. However, many situations may call for drastically different levels of allowable flow prior to shutoff, for example, some households might allow only 2 minutes of water flow at night for flushing the toilet.

The prior art has no automatic means to handle common everyday situations where lengthy water flow is warranted such as watering the lawn. The water flow monitoring system in U.S. Pat. No. 5,287,884 to Cohen, 1994 Feb. 22, requires the system to be located in a manner such that it does not monitor a plumbing pipe which requires occasional lengthy water flow or the system must be turned off all together, with the chance that the user will forget to turn it back on.

OBJECTS AND ADVANTAGES

Damage to buildings and property from water pipe leaks, forgotten running faucets and vandals intentionally creating a flood are common problems. The damage can be greatly reduced or eliminated if a system provided a capability to automatically shutoff the water supply in the case of excess water flow.

It is therefore a principle object of the present invention to provide an improved excess flow detection and shutoff device by:

(a) using a single microphone sealed in an air tube and amplifier circuit to detect excess water flow.

(b) significantly reducing false activations of the automatic water shutoff device by using a microprocessor to monitor the water flow detector output, and then compare it to flow threshold duration and maximum sustained water flow duration values provided by the user. The continuous comparison will eliminate momentary external noise from causing false activation of the automatic water shutoff device. The programmable threshold and maximum sustained water flow duration shall allow adjustment for different expected water usages such as day, night or vacations.

(c) making the entire automatic water shutoff device non-intrusive thereby avoiding any plumbing modifications by; 1) using an electric motor to open and close an existing water supply valve and 2) using the microphone externally to the supply line to detect the excess water flow.

(d) providing operation of the automatic water shutoff device in the event of alternating current power failure by continuously charging a battery to power the motor and the circuit. In the event of a power failure, the device could still operate for the life of the battery charge.

(e) providing a simple water shutoff device reset capability, prior to closing of the existing water supply valve, in case extended water flow is required by the user. The user is notified that water shutoff is imminent by; 1) an audio alarm sounding and 2) a momentary automatic closing and opening of the existing water supply valve. The user can respond to the alarms by turning the flowing water off a few seconds and the automatic water shutoff device will reset itself allowing the extended water flow until it once again exceeds the excess flow time.

(f) providing emergency shutoff of the water supply by furnishing a remote valve shutoff switch or simply depressing a valve close switch located on the automatic water shutoff device.

(g) allowing an automatic sprinkler system to use an excess amount of water by providing a disable capability to the automatic water shutoff device.

DESCRIPTION OF DRAWINGS

In the drawings, closely related figures have the same number but different alphabetic suffixes. FIG. 3b is a continuation of FIG. 3a.

Figure 1A:
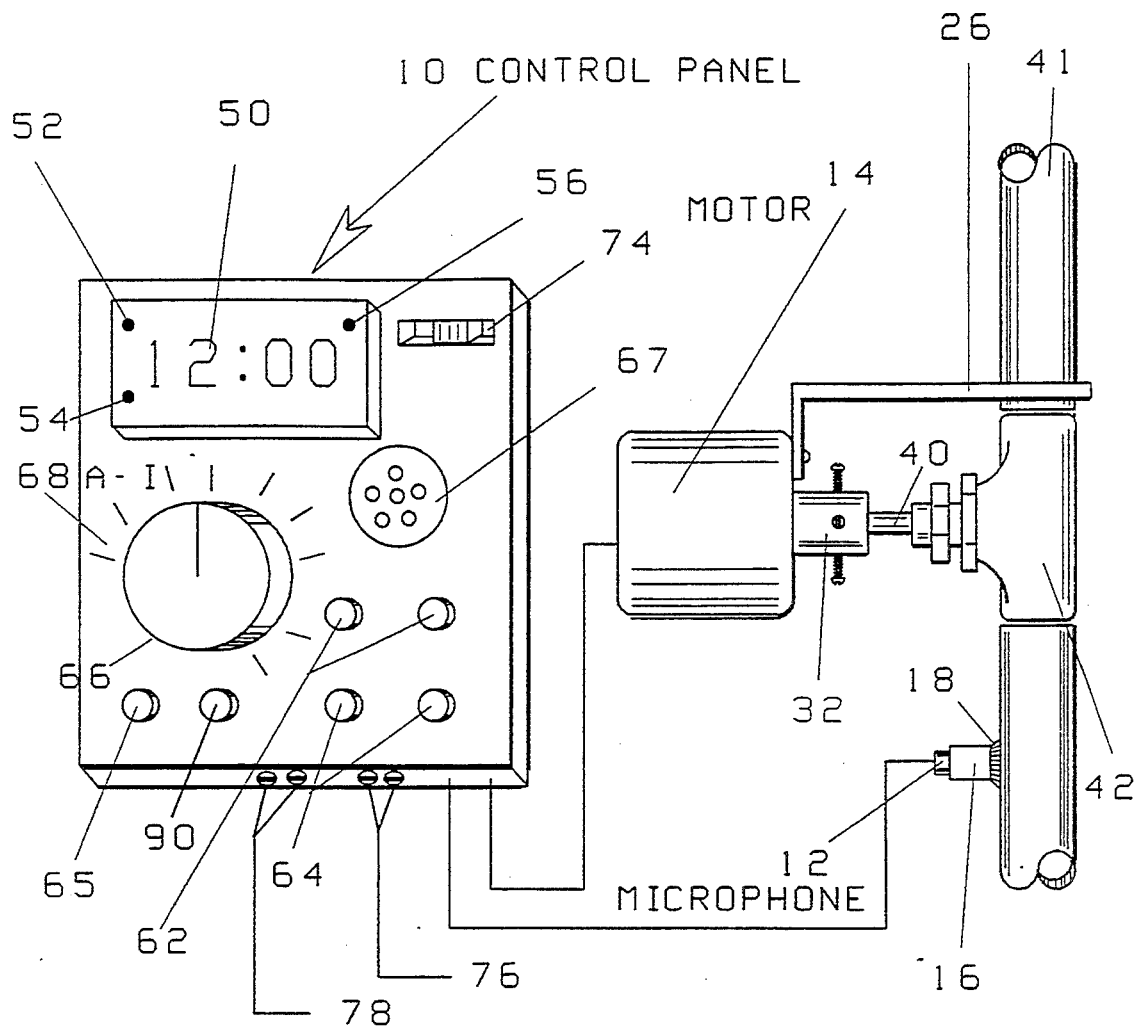
FIG. 1a is a plan view of the automatic water shutoff device.

REFERENCE NUMERALS IN DRAWINGS 10 control panel
12 microphone
14 high torque motor
16 hollow plastic tube
18 pliable putty
26 motor bracket
30 motor shaft
32 valve stem connector
36 pilot holes
38 sheet metal screw 40 valve stem
41 plumbing pipe
42 existing water supply valve
50 LED display
52 AM indicator light
54 PM indicator light
56 water-on indicator light
62 change time fast/slow switches
64 open/close valve switches
65 reset switch
66 mode selector switch
67 alarm speaker
68a a clock mode
68b b start time 1 mode
68c stop time 1 mode
68d duration 1 mode
68e start time 2 mode
68f stop time 2 mode
68g duration 2 mode
68h peak water-on time mode
68i total water-on time mode
68j test mode
74 power switch
76 remote disable microprocessor interrupt
78 remote valve activation microprocessor interrupt
80 capacitor
82 amplifier circuit
84 capacitor
86 comparator circuit
88 resistor
89 resistor
90 sensitivity control potentiometer
92 water detection microprocessor interrupt
98 read only memory
100 microprocessor
101 random access memory
102 microprocessor interface
106 optical isolator interface
108a relay
108b relay
110 battery
112 recharger

DESCRIPTION OF FIGURES

FIG. 1a depicts a plan view of a basic version of the automatic water shutoff device. The device is controlled by using a operator control panel 10. This panel 10 includes: A LED display 50 with an AM indicator light 52 and a PM indicator light 54 to the left. A water-on indicator light 56 is to the right of the LED display 50. The LED display 50 consists of four illuminated digits used to display clock times and other values. To the far right of the LED display 50 is a power switch 74. This switch 74 disables power to the entire device, including battery power. Below the power switch 74 is an alarm speaker 67. The alarm speaker 67 provides advanced audio warning of imminent automatic water shutoff. Directly below the LED display 50 is a mode selector switch 66. This switch 66 allows the user to select different modes for entering values and displaying information. The mode selector switch consists of nine switch positions: clock mode 68a, start time 1 mode 68b, stop time 1 mode 68c, duration 1 mode 68d, start time 2 mode 68e, stop time 2 mode 68f, duration 2 mode 68g, peak water-on time 68h and total water-on time 68i. The two switches to the right of the mode selector switch 66 are change time fast/slow switches 62. These switches 62 allow the user to increment clock values quickly or slowly such as when setting the current time. Directly below the change time fast/slow switches 62 are open/close valve switches 64. These switches are used to electrically activate the motor which opens or closes the existing water supply valve 42. To the immediate left of the valve switches 64 is a sensitivity control switch 90. This switch is used to determine the minimum level of water flow needed to activate the water flow detector. To the left of the sensitivity control 90 is a reset switch 65. This switch 65 is used to stop the alarm 67 from sounding and to prevent the motor 14 from closing the existing water supply valve 42. The two connectors the bottom of the control panel 10 are a remote disable interrupt 76 and a remote valve activation interrupt 78. Electrically connected to the control panel 10 are a microphone 12, and a high torque motor 14. The microphone 12 is sealed within a tight fitting hollow plastic tube 16. The plastic tube 16 is secured to plumbing pipe 41 with a pliable putty 18. Partly surrounding the same pipe is a metal bracket 26 used to prevent the motor from rotating when closing the existing water supply valve 42. The metal bracket 26 is attached to the casing of motor 14. Protruding from the motor 14 is a motor shaft 30 which is force fitted into a valve stem connector 32. The valve stem connector 32 is secured to an existing valve stem 40 by four sheet metal screws 38.

Figure 1B:
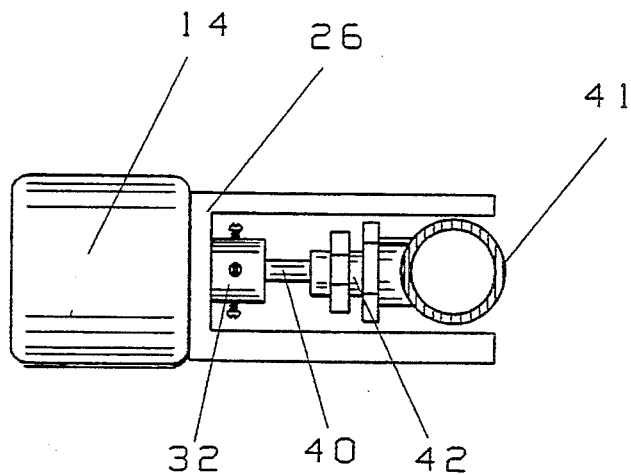
FIG. 1b is a top view of the motor bracket.

FIG. 1b depicts from the top view how the motor bracket 26 surrounds the plumbing pipe 41. When the valve stem connector 32 rotates the valve stem 40 for opening or closing the existing water supply valve 42, the motor bracket 26 prevents the motor 14 from rotating by locking up against the plumbing pipe 41.

Figure 1C:
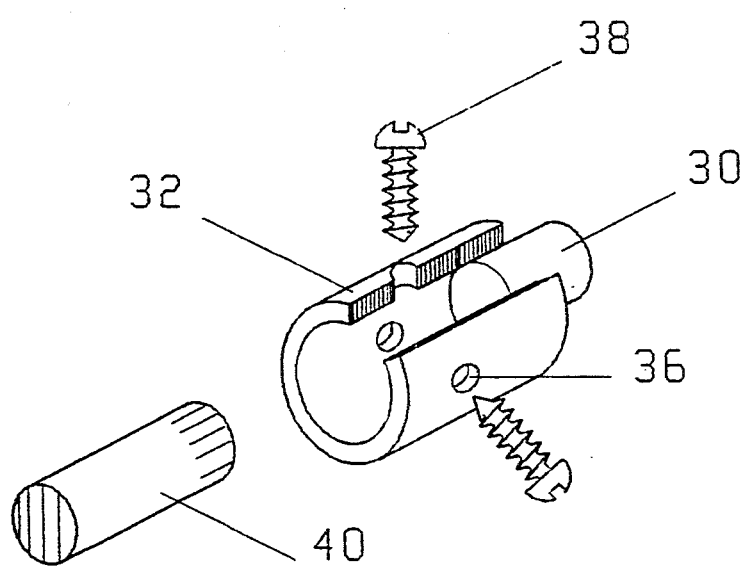
FIG. 1c is an exploded perspective view of the valve stem connector.

FIG. 1c is an exploded cut-away view of the valve stem connector 32. The motor shaft 30 is force fitted into one end of the valve stem connector 32. As the motor shaft 30 turns so will the valve stem connector 32. The connector 32 is large enough to accommodate all valve stem 40 sizes. The valve stem 40 fits into the other end of the connector 32 opposite the motor shaft 30. The valve stem 40 feeds all the way into the connector 32 past the four pilot holes 36. Once the valve stem 40 is seated the four sheet metal screws 38 are inserted in the pilot holes 36 and tighten with a screwdriver. This causes the screws 38 to bore into the soft brass valve stem 38 and forces the valve stem 40 to turn when the valve connector 32 turns.

Figure 2A:
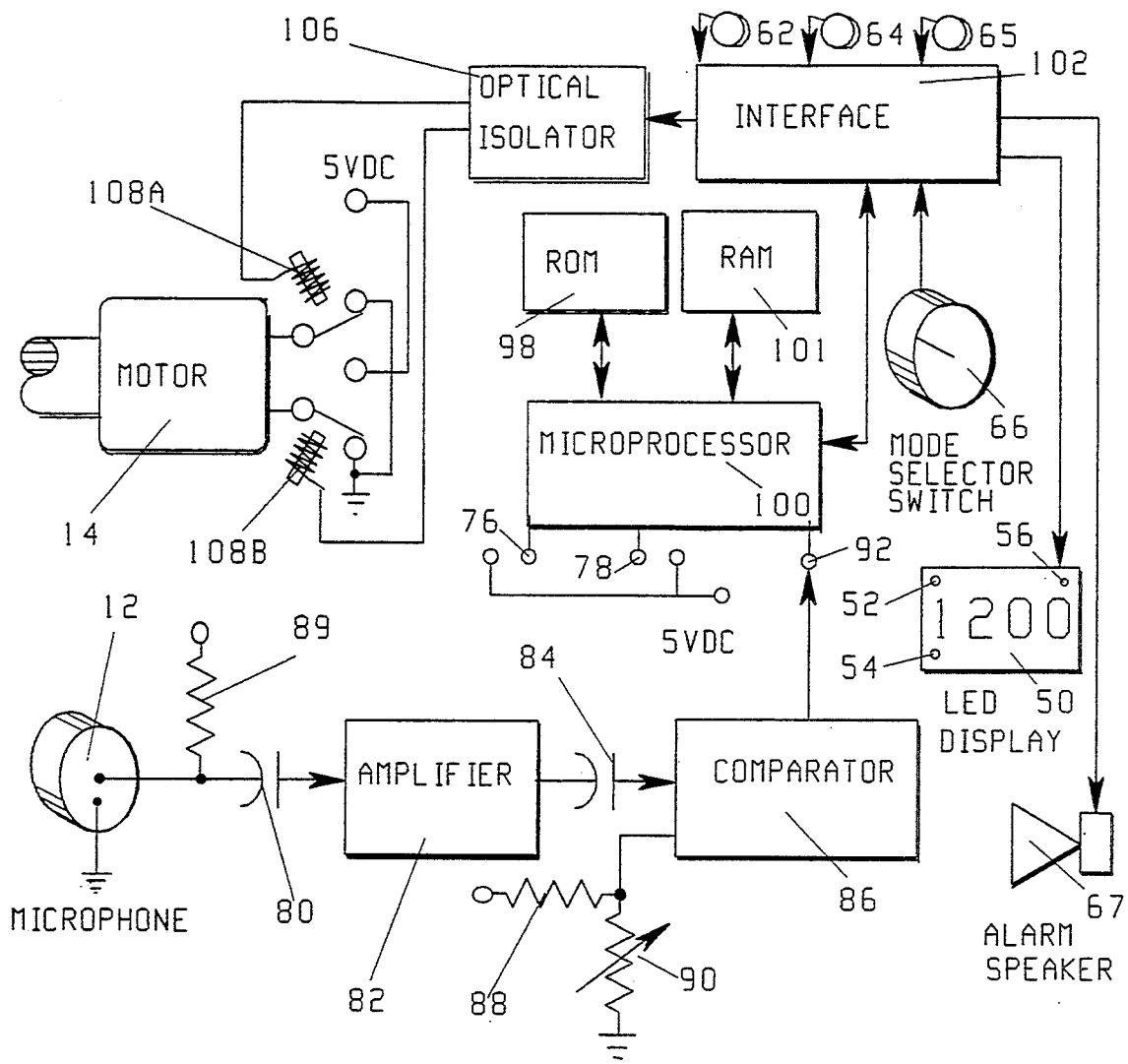
FIG. 2a is a schematic view of the circuit.

FIG. 2a is a schematic view of the circuit used to implement the automatic water shutoff device. The microphone 12 draws power through a resistor 89 and is connected to an amplifier circuit 82 through a capacitor 80. The alternating current signal from the microphone 12 is amplified by the amplifier circuit 82, passed through a capacitor 84 and sent to a comparator circuit 86. The voltage level from the amplifier circuit 82 is compared to the voltage level provided by the voltage divider circuit comprised of a resistor 88 and a sensitivity control potentiometer 90. If the voltage input from the amplifier circuit 82 is greater than the voltage level provided by the voltage divider circuit, an output is provided by the comparator circuit 86 to a microprocessor 100 via a microprocessor interrupt 92. Two other interrupt signals are available to the microprocessor 100. When a short is provided between the 5 volt direct current terminal and a microprocessor interrupt 76, the automatic water shutoff device will be deactivated. When a short is provided between the 5 volt direct current terminal and a microprocessor interrupt 78, the device will activate the motor 14 and close the existing water supply valve 42. The microprocessor 100 is connected to read only memory 98 through address and data lines. Program and default data are stored in the read only memory 98. The microprocessor 100 is also connected to random access memory 101 through address and data lines. The random access memory 101 is used to hold the automatic water shutoff device data while the device has power applied. The last connection to the microprocessor 100 is the microprocessor interface 102. The microprocessor interface 102 is used to connect the microprocessor to other 5 volt direct current devices, making it possible to send and receive information from the control panel 10. Connected to the interface are the mode selector switch 66, switches 62,64,65, the LED display 50, indicator lights 52,54,56, the alarm speaker 67 and a optical isolator circuit 106. The optical isolator circuit 106 is used by the microprocessor 100 to control high current relays 108a and 108b. The relays are normally not powered which forces the two connections of the motor 14 to ground. Power supplied to the relay 108a from the optical isolator circuit 106 will connect one lead of the motor to 5 volts. Since the other lead is connected to ground, the motor 14 will activate and rotate the valve stem connector 32 clockwise. Power supplied to relay 108b will cause the connector 32 to rotate counter-clockwise.

Figure 2B:
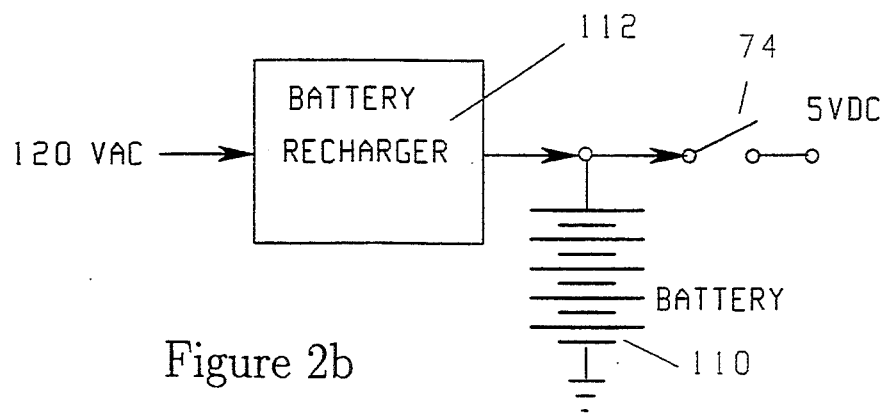
FIG. 2b is a schematic view of the power circuit.

FIG. 2b is a schematic view of the circuit used to power the automatic water shutoff device. Alternating current is supplied from a common household 120 volt wall outlet to a battery recharger 112. Current is supplied to a battery 110 from the recharger 112 which maintains the battery in a charged state and supplies power to the device. Power switch 74 removes or applies power to the device.

FIGS. 3a through 3d contain flow charts which depict the software processing used to control the automatic water shutoff device. The software resides in the read only memory 98 and is utilized by the microprocessor 100. The random access memory 101 is initialized using default values contained in the read only memory 98. The values initialized are a 24 hour software clock and the user accessible time settings. The clock is updated and checked for 24 hour rollover. In case of clock rollover, the clock, peak water-on time, and total water-on time are reset to zero. The software then reads and processes the user mode selections and switch activations which are accessible via the control panel 10. If the reset switch 65 is selected, the audio alarm 67 is turned off, and the software flow counter is reset. If the an open valve switch 64 is selected, the motor 14 is activated in order to open the existing water supply valve 42. For a close valve switch 64 selection, the motor 14 is activated in order to close the existing water supply valve 42.

Figure 3A:
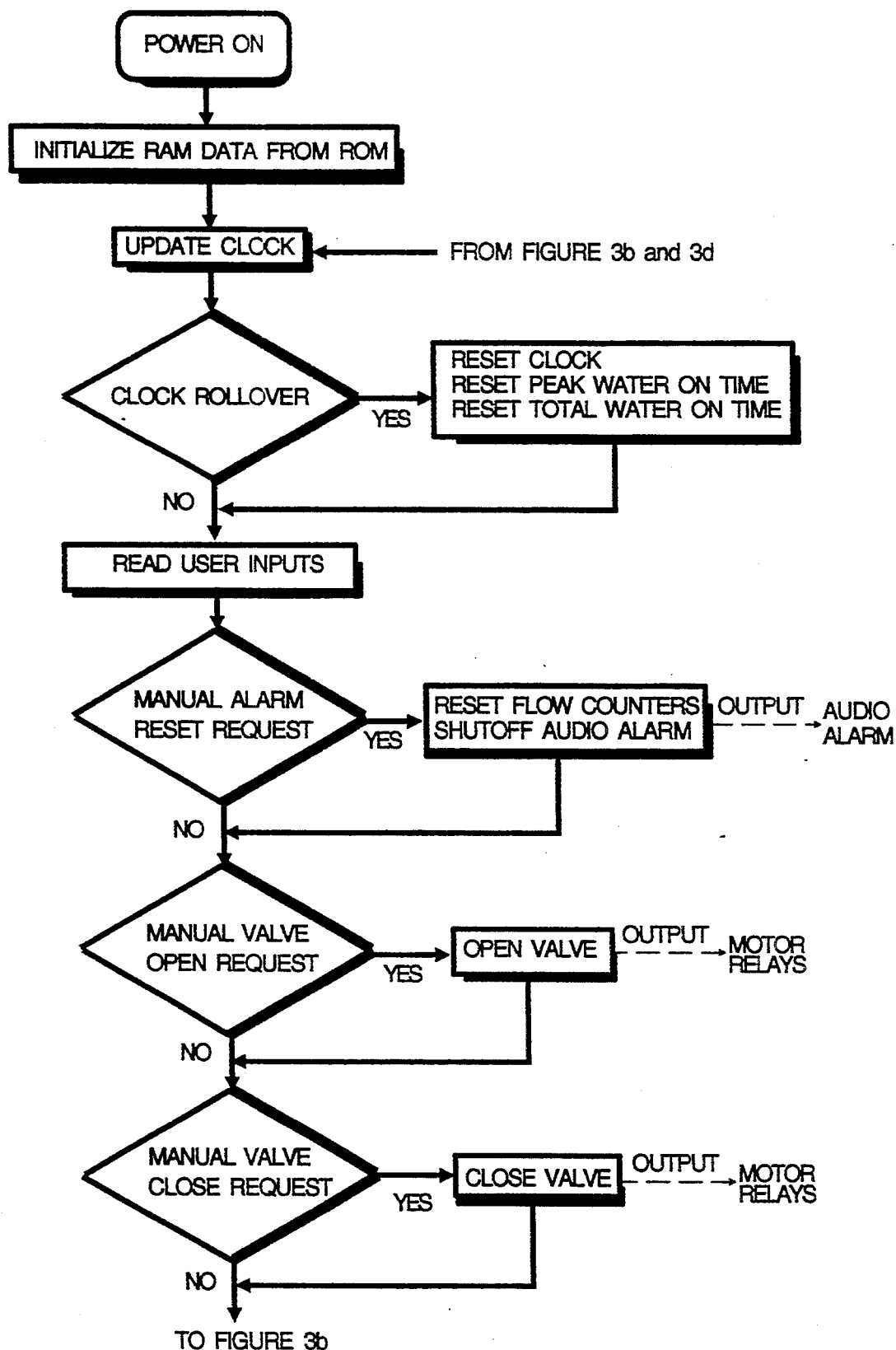
FIG. 3a depicts the microprocessor software control of the automatic water shutoff device.
Figure 3B:
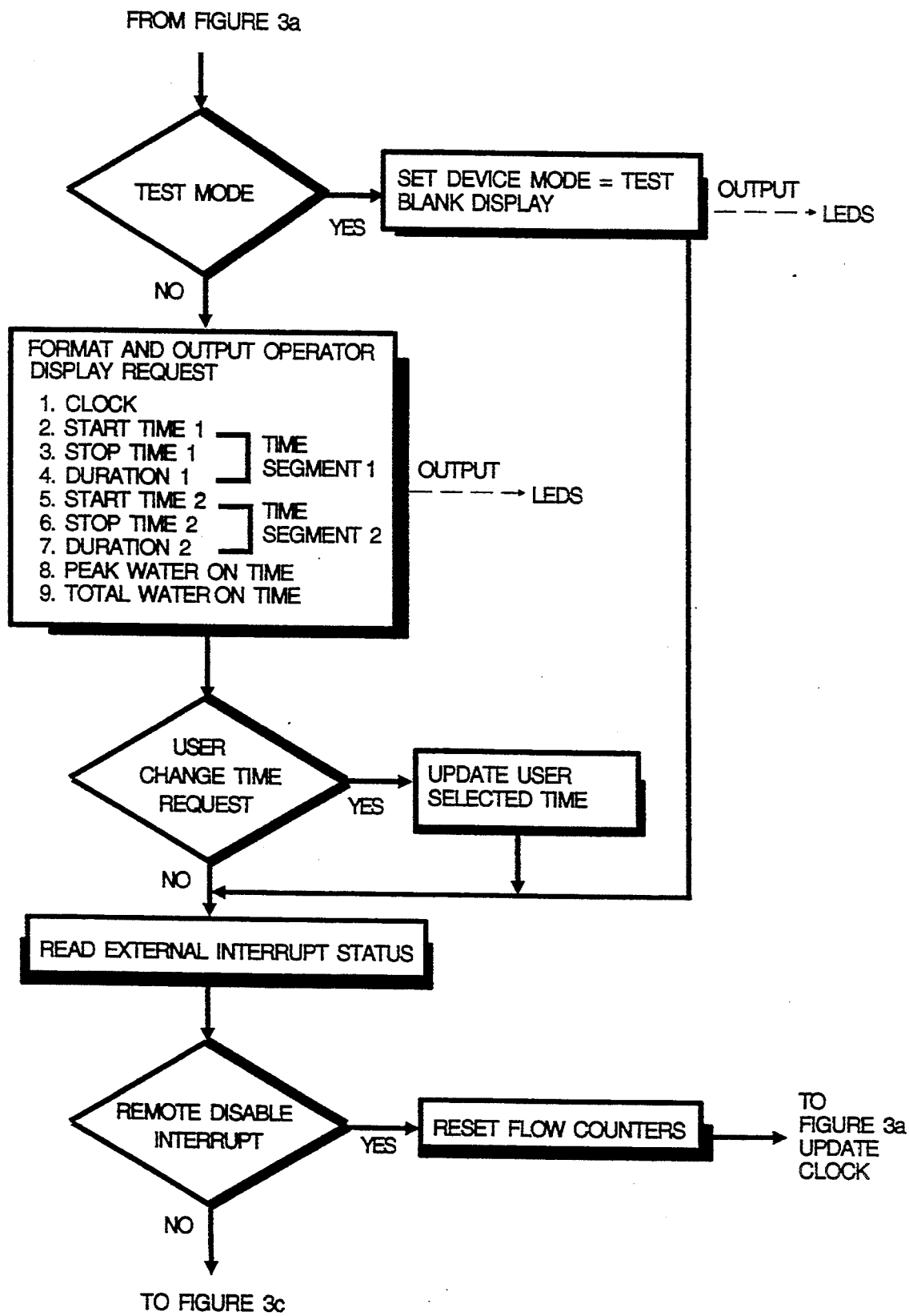

FIG. 3b is a continuation of FIG. 3a. If test mode is selected, the automatic water shutoff device is put into test mode and the LED display 50 is blanked. For a display request input the requested data is formatted and sent to the LED display 50. For a change time fast/slow switch 62 selection the requested time setting is updated and saved. Upon completion of user input processing, the external interrupt inputs 76, 78, 92 are read. For a remote disable interrupt 76 the flow counter is reset and software control is passed back to the update clock software function.

Figure 3C:
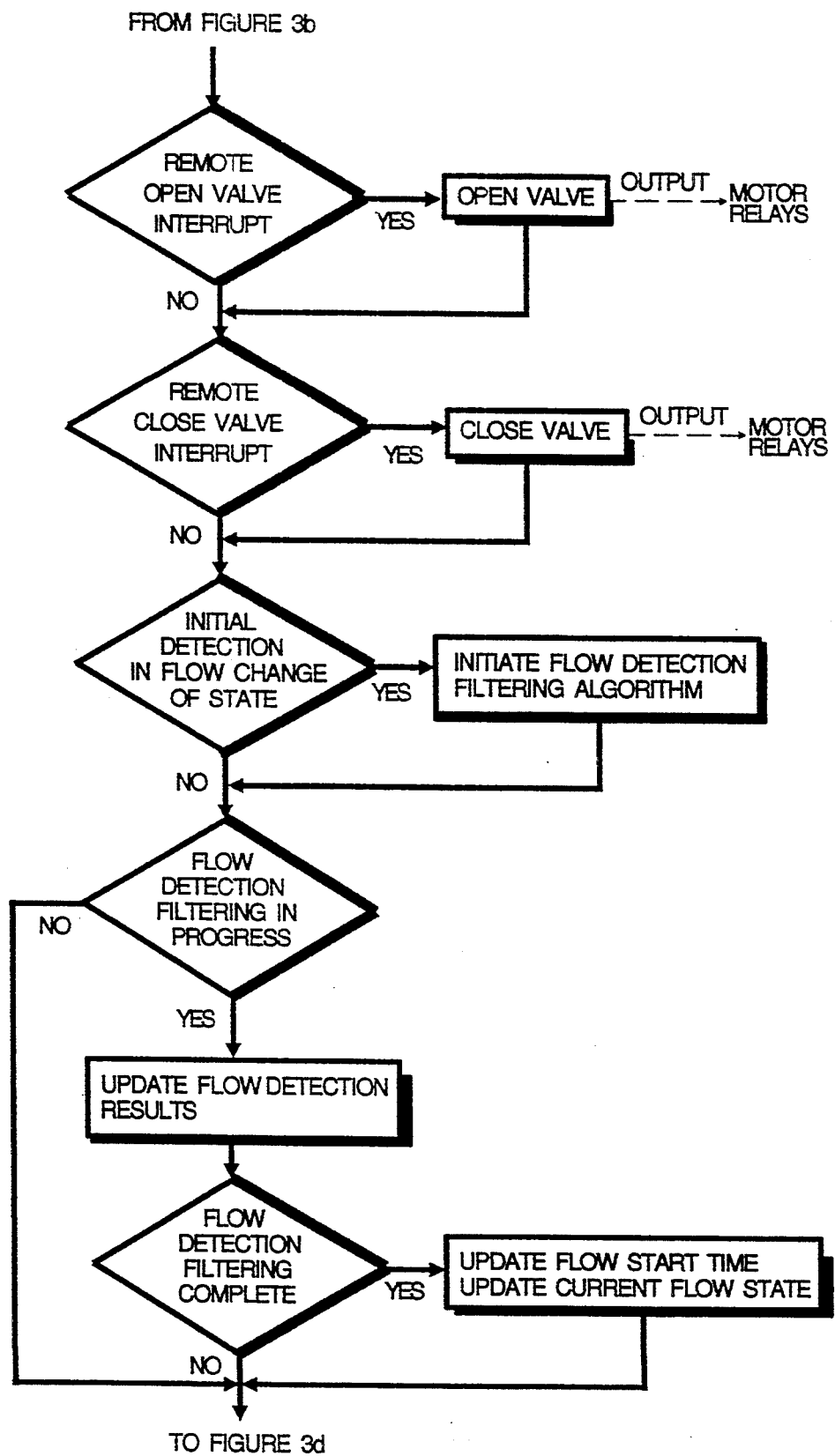
FIG. 3c is a continuation of FIG. 3b.

FIG. 3c is a continuation of FIG. 3b. For a remote open valve activation interrupt 78 the motor 14 is activated in order to open the existing water supply valve 42. For a remote close valve activation interrupt 78 the motor 14 is activated in order to close the existing water supply valve 42. For a water detection interrupt 92 a check is made to see if an initial detection in the flow state has occurred. If this is the case, a flow detection filtering algorithm is invoked. A check is then made in order to determine if the flow detection filtering algorithm is already in progress, and if so, the current water detection interrupt state 92 is saved. A check is then made in order to determine if the flow detection filtering algorithm has processed enough water detection interrupt samples to complete the filtering process. Upon completion of filtering, the flow start time is updated, and the current flow state is saved.

Figure 3D:
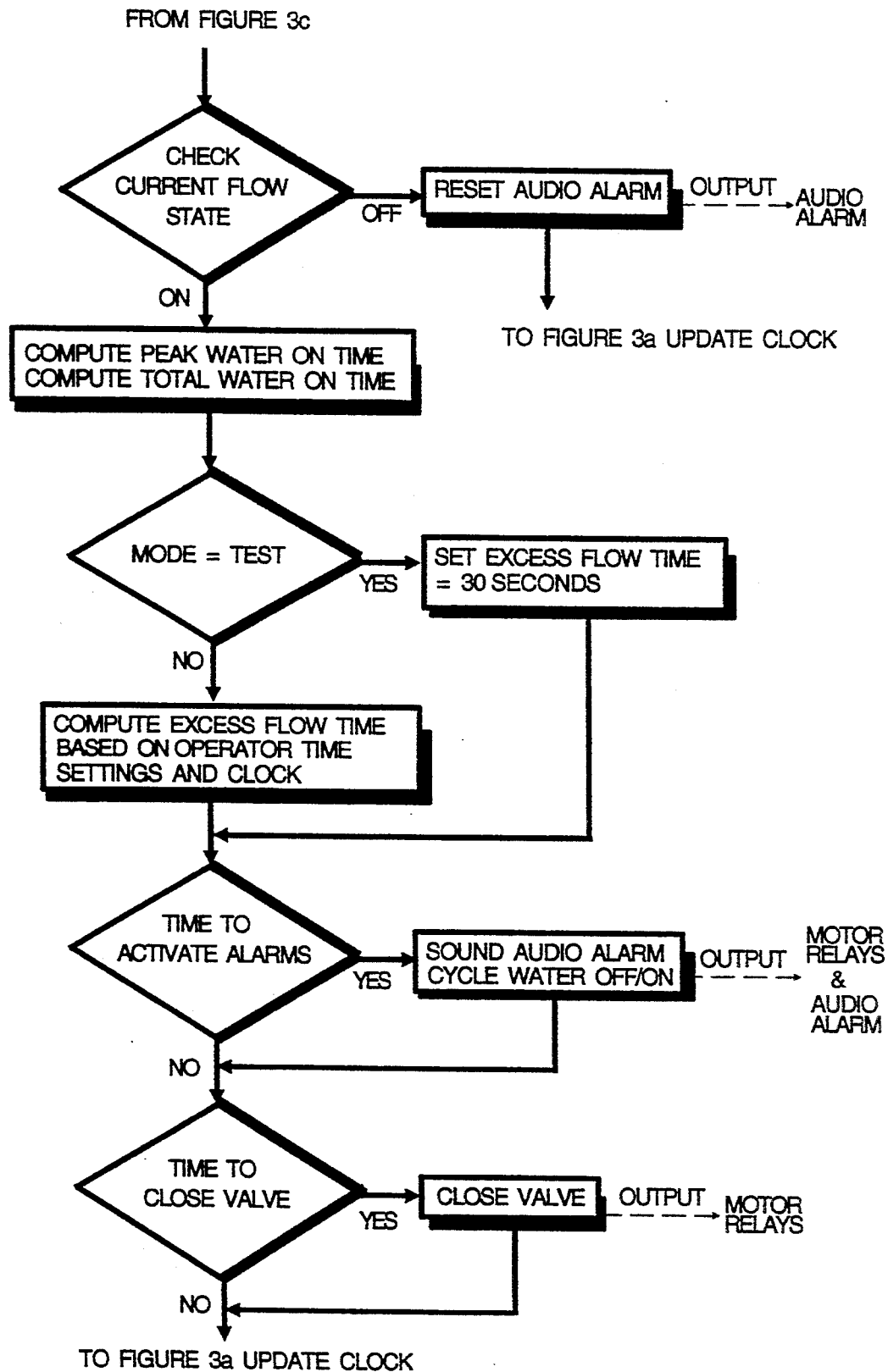
FIG. 3d is a continuation of FIG. 3c.

FIG. 3d is a continuation of FIG. 3c. If the current flow state is off, the alarm speaker 67 is turned off, and software control is passed back to the update clock software function. If the current flow state is on, the peak water-on time and total water-on time values are computed. The maximum continuous excess flow time is then computed. When the automatic water shutoff device is in test mode, the maximum continuous excess flow time is set to 30 seconds. When the automatic water shutoff device is not in test mode, the maximum continuous excess flow time is computed using the user accessible time settings and the software clock. A check is then made to determine if the current flow on time is within 5 minutes of the maximum continuous excess flow time. If this is the case, the audio alarm 67 is activated and a momentary closing of the existing water supply valve 42 is performed by activating the motor 14. A check is then made to determine if the current flow on time exceeds the maximum continuous excess flow time. If it does, the motor 14 is activated in order to close the existing water supply valve 42. Control is then passed back to the update clock software function and the entire software loop is then repeated.

OPERATION OF INVENTION

The manner of using the automatic water shutoff device to prevent excess water flow is best described starting with the circuit diagram FIG. 2a. Once power is supplied to the device by selecting the on position of the power switch 74, the microprocessor 100 automatically executes the microprocessor software instructions which are stored in the read only memory 98. Power is also supplied by the battery 112 in the event of 120 volt alternating current failure. The microprocessor 100 will set up default values in random access memory 101, start a 24-hour software clock, and display the default time on the LED display 50. The microprocessor 100 will also monitor the interrupt lines 92, 76 and 78.

The interrupt line 92 is driven by the comparator circuit 86. When the microphone 12 detects the sound of water flowing through the plumbing pipe 41, a signal is passed through capacitor 80 to the amplifier circuit 82. The amplified signal is then passed through capacitor 84 and compared, using compare circuit 86, to the signal threshold voltage set by the sensitivity control potentiometer 90. If the signal exceeds the threshold, the water detection interrupt line 92 is triggered.

The microprocessor 100 samples the water detection interrupt line 92 at regular intervals, testing for a trigger. The microprocessor 100 will require the trigger to be set four out of five samples to trigger a water-on event. Once a water-on event is detected a software timer is started. This timer monitors the start time of the water-on event. If the water-on event lasts longer than a) the default values in random access memory 101 or b) the values set up in random access memory 101 by the mode selector switch 66, a shut-off event is required. Five minutes prior to the timer exceeding the excess flow time; a) the alarm speaker 67 will sound and b) a momentary closing of the existing water supply valve 42 will occur. This affords the user the opportunity to reset the device and prevent the automatic shutoff of the water. Once the microprocessor 100 does not detect at least three interrupt line 92 triggers out of five samples, it will determine the water is off, reset the software timer, and sample for the next interrupt. Therefore, the automatic water shutoff device can be reset from a remote location simply by turning off the water long enough for it to detect five samples of no water flow. Depressing the reset switch 65 on the control panel 10 will accomplish the same thing.

A shutoff event can also be instantly invoked by connecting the interrupt line 78 to 5 volts. This might be used in an emergency situation such as a broken water faucet or for ease of operating the shutoff valve for the physically impaired. The shutoff event can automatically be prevented by connecting the interrupt line 76 to 5 volts. This feature could be used by automatic fire suppression systems to prevent the automatic water shutoff device from shutting off the water supply when lengthy water flow is required to put out a fire.

The existing water supply valve 42 is closed by the microprocessor instructing the microprocessor interface 102 to enable the optical isolator circuit 106 which, in turn, enables relay 108b. Relay 108b provides 5 volts direct current from the battery 110 to the high torque motor 14. Since the optical isolator interface 106 does not provide power to relay 108a, it is disabled, which in turn provides ground to the other terminal on the high torque motor 14. With a potential difference of 5 volts, the motor shaft 30 will rotate clockwise forcing the valve stem connector 32 and the valve stem 40 to rotate clockwise, closing the existing water supply valve 42 and shutting off the water supply.

FIG. 1b and 1c show how the motor 14 will close the existing valve supply valve 42. The motor is connected to the existing valve 42 by first removing the existing shutoff handle which is normally held on by a single screw. The valve stem connector 32 is slid over the valve stem 40 and is firmly attached by turning the sheet metal screws 38 until they bore into the soft brass valve stem 40. The other end of the valve stem connector 32 is permanently attached to the motor shaft 30. When power is supplied to the motor 14, the motor shaft 30 will rotate the valve stem connector 32 clockwise, closing the existing water supply valve. The top leg of the motor bracket 26 shown in FIG. 1b will prevent the motor 14 from rotating.

The control panel 10 of FIG. 1a is used to provide the user the capability to change the default values in random access memory 101 and to provide feedback to the user through the LED display 50 and the indicator lights 52, 54 and 56. Normal operation of this automatic water shutoff device is obtained by placing the mode selector switch 66 in clock mode. In this mode the current time is displayed on the LED display 50 and the appropriate AM/PM indicator 52 and 54 is illuminated. The current time of day can be changed by activating either the fast or slow switch 62 to increment the clock. Once the clock increments to 11:59 PM it will roll over to 00:00 AM. The mode selector switch positions 68a–68i are used to change the default times in random access memory 101. These times determine how long the water is allowed to run at certain times of the day. A 24 hour period can be broken into a maximum of two segments. Start time one and stop time one defines the first time segment. Start time two and stop time two defines the second time segment. When start time one mode 68b is selected the fast/slow 62 switches are used to change the default start time for the first time segment. For example, if the user wanted to limit the water flow duration to one continuous hour between the hours of 8:00 AM and 6:00 PM, he/she would select start time one mode 68b and use the fast/slow 62 switches to obtain 8:00 AM. The same process would be used to set stop time one mode 68c to 6:00 PM and duration one mode 68d to 1:00 hour. The two independent time segments can use two different duration settings or the same duration can be set in both. The limits of the duration are 1 minute to 23 hours and 59 minutes. The two independent time segments can be used to provide 24 hours of coverage or up to two gaps can be left open for lawn watering or lengthy water usage periods.

The peak water-on time mode 68h is used to display, on the LED display 50, the longest continuous usage of the water, in minutes, since midnight. This mode position can be used to monitor the daily patterns of water use and fine tune the values used for duration one and two of time segments one and two. The total water-on time mode 68i is used to display, on the LED display 50, the total accumulated time the water has been on since midnight. This mode is useful to monitor the water-on time usage for the household. The remaining position on the mode selector 66 is test mode 68j. The test mode 68j is used to test the installation and functionality of the automatic water shutoff device. When this mode is selected, the microprocessor 100 will set the water-on duration to 30 seconds. The user can then turn on the water at any facet. The alarm will sound immediately and the water-on indicator light 56 will illuminate. The motor 14 will close the existing water supply valve 42 and shutoff the water after 30 seconds of continuous water flow.

Another feature of the control panel 10 is the sensitivity control 90. The user can set the amount of water flow that will trigger the comparator circuit 86. The minimum threshold or highest sensitivity is gained by first turning off the water flow through the pipes, and then slowly turning the sensitive control switch 90 clockwise until the water-on indicator light 56 illuminates, and then turning the sensitivity control switch 90 counterclockwise ¼ turn. The same procedure would be used if a higher threshold is desired, e.g. for a humidifier which requires a small continuous flow of water, except that the small flow of water through the pipe would be present.

CONCLUSION AND SCOPE OF INVENTION

The automatic water shutoff device of the present invention provides excess water flow protection without any modifications to the existing plumbing and is highly programable to fit any residential or business need. While the above description contains many specificities, they should not be construed as limitations on the scope of the invention, but rather as an exemplification of one preferred embodiment thereof. Many other variations are possible. Accordingly, the scope of the invention should be determined not by the embodiment illustrated, but by the appended claims and their legal equivalents.

We claim:

1. A readily detachable fluid shutoff device for stopping the flow of excess fluid in plumbing pipes of a plumbing pipe system, said fluid shutoff device comprising a detachable acoustic flow monitor means disposed outside said plumbing pipe for sensing the flow of fluid through said pipe, a control means for determining flow duration time of the continuous flow of fluid sensed by said acoustic flow monitor means and a storage means to store a comparison shutoff time within said control means, a detachable value actuating means activated by said control means when flow duration time exceeds comparison shutoff time stored by said control means, a plumbing pipe valve means activated in response to said detachable valve actuating means whereby plumbing pipe system modifications are not required in order to stop the flow of excess fluid in said plumbing pipes.

2. The device of claim 1 wherein said detachable acoustic flow monitor means is a microphone sealed in an air tight enclosure attached to said plumbing pipe.

3. The device of claim 2 further includes an amplifier means.

4. The device of claim 1 wherein said detachable valve actuating means is an electrically operated motor connected to said plumbing pipe valve means with a connector which is secured with a set of screws.

5. The device of claim 1 further includes an audio indicating means invoked prior to activation of said valve actuating means whereby warning is provided prior to stopping the flow of excess fluid in said plumbing pipe.

6. The device of claim 1 wherein said control means is a microprocessor based circuit.

7. The device of claim 1 further includes a reduction of fluid flow means by partially closing said plumbing pipe valve means prior to completely shutting off fluid flow whereby warning is provided prior to stopping the flow of excess fluid in said plumbing pipe.

8. The device of claim 1 further includes a flow duration time reset means activated when said acoustic flow monitor means senses the flow of fluid through said plumbing pipe has stopped.

9. The device of claim 1 further includes a total water usage storage means whereby flow duration time is accumulated and retained to provide water usage, in time, for an extended period of time.

* * * * *